Patented Oct. 30, 1934

1,978,506

UNITED STATES PATENT OFFICE 1,978,506

CATALYTIC OXIDATION OF ORGANIC COMPOUNDS AND CATALYST THEREFOR

Elton B. Punnett, Buffalo, N. Y., assignor to National Aniline & Chemical Company, Inc., New York, N. Y., a corporation of New York No Drawing. Application August 2, 1928, Serial No. 297,089

51 Claims. (Cl. 260—123)

This invention relates to processes of catalytic oxidation of organic compounds and to improvements in such processes. It relates more particularly to improvements in the process of catalytic oxidation of organic compounds in which an oxidation reaction is caused to take place between an organic compound in the vapor state and an oxygen-containing gas in the presence of a catalyst, and relates especially to improvements in catalysts for said reactions and carriers for said catalysts.

One of the objects of the invention is to increase the production of useful partial oxidation products of organic compounds and simultaneously to decrease the production of contaminating oxidation products.

Another object of the invention is to produce phthalic anhydride of high quality and in increased yield by the partial oxidation of naphthalene in the vapor phase and in the presence of a catalyst.

Another object of the invention is the production of phthalic anhydride by a process carried out practically continuously over comparatively long periods of time.

Another object of the invention is the provision of a distender or carrier for the catalyst which is relatively inert under the conditions of the reaction, which is relatively rigid, which is relatively infusible, which does not dust, which causes relatively no deterioration of the catalyst, and which has a high degree of porosity and high tenacity for the catalyst.

Another object of the invention is the addition to the catalyst of a promoter or activator therefor, enabling either a shortening of the time of contact between the gas stream and the catalyst, and consequently a greater output of product per unit of apparatus, or a lowering of the operating temperature.

Other objects of the invention will be apparent from a consideration of the following disclosure which is given for the purposes of illustrating the invention.

It is well known that various organic compounds can be oxidized to useful products by treatment in the vapor phase with an oxygen containing gas (for example, air) and in the presence of a catalyst under properly controlled conditions of operation; such as, temperature, speed of gas stream, etc. Thus, the oxidation of methyl alcohol to formaldehyde, of benzene to maleic acid, of naphthalene to phthalic anhydride, and the like, have all been carried out under various conditions of temperature, concentration of gases, time of contact between the gases and the catalyst, and with various catalysts, with and without carriers of various kinds. In carrying out the catalytic oxidation of organic compounds in the vapor phase, it is customary to pass the compound in vapor phase, mixed with air or other gas containing free oxygen, through a tube or other enclosed space filled with the catalyst which is usually deposited upon a distender or carrier.

The oxidation of naphthalene, for example, in the vapor phase mixed with air, and in the presence of a catalyst, with or without a carrier, has been heretofore the subject of considerable investigation. Thus, U. S. Patent No. 1,285,117 describes the production of phthalic anhydride using vanadium oxide as a catalyst, and U. S. Patent No. 1,284,888 discloses the use of molybdenum oxide as a catalyst. In these patents, asbestos and pumice are mentioned as being capable of being mixed with the catalyst. British Patent No. 170,022 describes the use of fused vanadium pentoxide as a catalyst; and U. S. Patent No. 1,489,741 describes the use of mixed oxides as catalysts, mentioning also the use of crushed pumice as carrier. In addition, the action as a catalyst of metal oxides, and particularly of vanadium oxide, deposited upon other distenders or carriers has been investigated.

It has been found, according to the present invention, that if the metal oxide catalyst (for example, vanadium oxide) is impregnated within, or coated on, fragments, pellets or chips of a porous, fused aluminum oxide material, for example porous "Alundum", preferably of a quality or grade used for filter-plates or blocks, pipes, and similar chemical apparatus, and particularly one containing grains of fused alumina bonded into a porous mass by a suitable ceramic material, for example, fused aluminum silicate, the difficulties had in connection with other carriers or distenders are obviated to a very large extent. "Alundum" of such quality possesses a high fusion temperature and high porosity, and retains the catalyst coating over a large surface with a high degree of tenacity. Its high rigidity prevents dusting and packing of the catalyst, especially in the lower portions of the catalyst tube, giving more equal distribution of the gas stream and therefore more even heat distribution. Its relative inertness prevents any appreciable reaction with the catalytic oxide, thereby resulting in a long-lived catalyst, and enabling continuous operation of the oxidation process over comparatively long periods of time.

It has furthermore been found, according to my invention, that in the vapor phase catalytic partial oxidation of naphthalene, vanadium pentoxide deposited upon a relatively inert, porous distender, such as "Alundum" fragments, in the presence or absence of a small quantity of an activator, such as aluminum, and under carefully regulated conditions of temperature, time of contact between the reacting gases and the catalyst, etc., gives a purer phthalic anhydride in greater yield than heretofore has been obtained under conditions feasible for commercial operation.

One form of "Alundum" found to be especially adaptable as a catalyst carrier consists of grains or crystals of alumina (such as, fused alumina) bonded by a suitable vitrified clay bond (such as, an aluminum silicate) into a porous mass which is broken into fragments, lumps or granules, of which the alumina comprises about 80 percent by weight of the mass, and the vitrified bond comprises about 20 per cent by weight of the mass.

In the preparation of the catalyzer or contact mass, it is preferable that the catalytic oxide e. g., the vanadium oxide, be in the most minutely divided state possible. The catalyzer can be prepared by starting with a solution of a suitable metal salt, which on ignition leaves the desired oxide, or by forming a water suspension of the metal oxide or hydroxide. "Alundum" in the form of small granules, lumps, etc., can be intimately mixed with the solution or suspension, and the mixture evaporated to dryness with stirring. The dry product can then be ignited. The resulting catalyzer or contact mass is composed of individual lumps or fragments of "Alundum" coated and/or impregnated with the catalytic oxide. If a more active catalyst is desired, this may be obtained by including in the mixture of carrier and solution, prior to the evaporation, a small amount, for example, a few per cent, of an activator or promoter; e. g., aluminum powder, which appears to enhance the activity of the catalyst.

The invention will be described in connection with the following example which is given for illustrative purposes only; it not being intended to limit the procedure to the details given, since the process can be varied throughout wide limits without departing from the spirit or scope of the invention. The parts are by weight.

*Preparation of catalyst*

86 parts of purified ammonium meta-vanadate are heated to boiling with 1600 parts of distilled water and maintained at the boiling temperature until all or substantially all of the vanadate is in solution. A few parts of ammonium hydroxide solution may be added, if desired, in order to aid in the solution of the vanadate, but its addition is not necessary. The solution is then poured onto 550 parts of porous "Alundum" fragments of a size that will be passed by a 4 and retained by an 8 mesh screen. The fragments can be obtained by breaking and screening pieces of grade RA98 "Alundum" molded material of the Norton Co. of Worcester, Mass. This is a highly porous fused aluminum oxide material used for filter-blocks, pipes, etc., and contains about 80 per cent of aluminum oxide and about 20 per cent of aluminum silicate, the aluminum oxide being in the form of minute, fused grains or crystals bonded into a porous mass by the vitrified aluminum silicate, and the aluminum silicate having a composition corresponding to about equal weights of alumina and silica. If it is desired to activate the catalyst, so that the time of reaction, that is, the time of contact between the reaction mixture and the catalyst may be decreased, about 1.5 parts of aluminum powder (No. 1 fine) are intimately mixed with the carrier. In either case, the solution is slowly evaporated to dryness with continuous stirring. The catalyst is then ignited in order to form the vanadium pentoxide or a mixture of vanadium oxides. This is preferably done in the converter, to save unnecessary handling and equipment; but it may be done in any suitable apparatus, and the finished catalyst charged into the converter. The fragments of "Alundum", coated with the dried ammonium vanadate, with or without the added aluminum as the case may be, are charged into a catalyst converter tube immersed in a liquid bath, and the ammonium vanadate is ignited by slowly raising the temperature of the bath while passing a stream of air through the tube, or in any other manner well known to the art. When the temperature reaches a point in the neighborhood, for example, of about 400° C., it is maintained approximately at that point until the ignition is complete. The contact mass is now ready for utilization.

Various partial oxidation products of organic substances may be obtained by passing in contact with the contact mass a mixture comprising air or other gas containing free oxygen and the organic substance in the vapor state; e. g., benzene, toluene, anthracene, methyl alcohol, ethyl alcohol, etc. It has been found, however, that the vanadium oxide contact mass above described appears to have a special action upon naphthalene for the production of phthalic anhydride, and accordingly an example of the preparation of phthalic anhydride using said contact mass will be given; but it will be apparent that the invention is not limited to the partial oxidation of naphthalene.

*Production of phthalic anhydride*

Naphthalene is vaporized and mixed with about 26 times its weight of air, and the mixture is passed through a converter tube containing a porous contact mass consisting of a porous "Alundum" carrier impregnated and coated with catalytic vanadium oxide, and prepared as hereinbefore described, the temperature of the catalyst being about 420 to 530° C., preferably about 475° C., the pressure being sufficient to force the gases through the apparatus under approximately 15 pounds gage pressure, and the time of contact between the vapor mixture and the catalyzer being about 0.2 seconds (calculated on the basis of the volume of vapor mixture passing through the void space in the catalyst charge per unit of time under the existing conditions of temperature and pressure). A yield of about 85 pounds to about 90 pounds of phthalic acid anhydride per 100 pounds of naphthalene charged into the reactor can be thus obtained.

It is to be understood that the invention is not limited to the above examples, and that the various proportions and conditions cited are all capable of wide variation.

Instead of the "Alundum" above described, other relatively inert, porous, infusible, rigid materials which tenaciously retain the coating, and do not cause appreciable deterioration, may be used; and the fragments or pieces may be of a size varying from about 2 to 20 mesh, although 4 to 8 mesh is preferred. The ratio of catalyst to carrier may vary from about 0.1 to 0.2, that is, from about 5 to 10 parts by weight of carrier per part of catalytic oxides, and the weight of aluminum powder, if added to the catalyst, may vary from about 1 to 5 per cent of the weight of the catalytic oxides. During the course of the oxidation process, a part of the added aluminum probably is converted to aluminum oxide, and where in the claims the expression "an activator comprising aluminum" is used, it is intended to include not only metallic aluminum but also aluminum oxide and compounds thereof which readily decompose to give aluminum or the oxide.

Various oxides, either alone or in admixture, may be employed as catalysts, said catalysts being impregnated into or deposited upon the rigid, infusible and relatively inert porous carrier, and the catalyzer or contact mass, i. e., catalyst and carrier, thus produced may be employed in the oxidation of organic compounds according to the present invention. For example, oxides of metals selected from the fifth and sixth groups of the periodic system (such as molybdenum, uranium, etc.), or mixtures of oxides of such metals (such as, vanadium and molybdenum, molybdenum and uranium, etc.), or other oxides, either alone or in admixture, may be used. Thus, the oxidation of benzene to maleic anhydride is specifically described in my copending application, Serial No. 297,091 for "Production of maleic anhydride", and the oxidation of methyl alcohol to formaldehyde is specifically described in my copending application Serial No. 297,090 for "Process of making formaldehyde", both filed of even date herewith.

It will be further more understood that the inclusion of the activator or promoter is not limited to a catalyst for the production of phthalic anhydride, but that catalysts for other oxidation reactions may be activated by the inclusion therewith of an activator such as aluminum, magnesium, manganese and their oxides, preferably in a finely divided form; as for example, the mixed vanadium and molybdenum oxide catalyst employed in the catalytic oxidation of benzene to maleic anhydride, as described and claimed in my co-pending application Serial No. 297,091, filed of even date herewith, for Production of maleic acid.

The catalyst may be prepared in a number of ways. For example, instead of evaporating a solution of ammonium vanadate to dryness and then igniting, solutions containing other salts or compounds of vanadium, or of another catalytic metal, which salts on ignition leave only the oxide or oxides of the metal, can be evaporated in the presence of the carrier; or it is possible to employ a water suspension of the oxides or hydroxides of the catalytic metal. Or solutions may be employed containing complex organic compounds of a catalytic metal, such as, vanadium, molybdenum, tungsten, manganese, bismuth, cerium, nickel, etc., and organic acids, such as, oxalic, malic, citric acid, etc., (as disclosed in copending applications of A. E. Craver, Serial Nos. 337,522 and 337,523 filed February 4, 1929), the solutions also being evaporated to dryness and then ignited. The catalyst may also be deposited on the carrier by spraying a solution of a suitable salt or other compound upon heated agitated fragments of carrier, and then igniting.

Various types of apparatus may be used in carrying out the process; for example, the catalyst may be placed upon shelves, trays, or in tubes. A form of apparatus found to be well adapted to the process, however, is one in which the catalyst is contained in vertical tubes immersed in a liquid temperature regulating bath, such as is shown, for example, in U. S. Patent No. 1,604,739; but it is to be understood that the invention is not restricted to any particular form of apparatus.

In the oxidation of naphthalene to phthalic anhydride, the ratio of naphthalene to air can be varied within wide limits; for example, ratios of about 10 to 50, preferably about 22 to 32 parts by weight of air to 1 part of naphthalene may be used. Instead of air, oxygen, ozone, or other oxygen-containing gases may be employed. The reaction temperature can also be varied from about 400° to 550° C., preferably from between about 420° and 470° to about 530° C., and the time of contact can be from about 0.05 to 0.5 seconds, preferably between about 0.2 to 0.25 seconds. The temperature and time of contact are inter-related, a higher temperature usually being employed with a higher rate of speed of the gas stream. These latter conditions are also dependent upon the activity of the catalyst, usually being lower with a more active catalyst; e. g., with the catalyst initially containing a small amount of added aluminum. Pressures at, above, and below atmospheric may be used, increase in pressure increasing the production of phthalic anhydride per unit of apparatus without deleteriously affecting the quality of the product within limits. A superatmospheric pressure of about 2 to 30 or 40 pounds, and preferably 15 to 20 pounds, per square inch has been found to be especially useful. Furthermore, the naphthalene treated need not be pure, but naphthalene of various grades can be treated according to the process described, without deleterious results.

The phthalic anhydride obtained may be recovered in a number of ways. It can be fractionally condensed from the gas stream in the well known manner, leaving the water, naphthalene, and other impurities to pass on; or it can be condensed together with the impurities and then purified, if desired, in any well known manner. It is noted, however, that the product obtained according to the above process is of a higher quality than that formerly obtainable, impurities due to overoxidation of the naphthalene being present in the product in much less proportion than was heretofore the case.

I claim:

1. A catalyzer for the vapor phase partial oxidation of organic compounds, comprising a porous contact mass composed of a relatively inert, relatively infusible, rigid, porous carrier impregnated and coated with a metal oxide which is an oxidation catalyst.

2. A catalyzer for the vapor phase partial oxidation of organic compounds, comprising a porous contact mass composed of a relatively infusible, rigid and porous carrier, containing fused aluminum oxide, impregnated and coated with a metal oxide which is an oxidation catalyst.

3. A catalyzer for the vapor phase partial oxidation of organic compounds, comprising a porous contact mass composed of a porous "Alundum" carrier impregnated and coated with a metal oxide which is an oxidation catalyst.

4. A catalyzer for the vapor phase partial oxidation of organic compounds, comprising a porous contact mass composed of a relatively inert, infusible, rigid, and porous carrier, in the form of fragments 2 to 20 mesh in size, impregnated and coated with a catalytic oxide selected from the oxides of the metals of the 5th and 6th groups of the periodic system.

5. A catalyzer for the vapor phase partial oxidation of organic compounds, comprising a porous contact mass composed of a highly porous "Alundum" carrier, in the form of fragments 2 to 20 mesh in size, impregnated and coated with a catalytic oxide selected from the oxides of the metals of the 5th and 6th groups of the periodic system.

6. A catalyzer for the vapor phase partial oxidation of organic compounds, comprising a porous contact mass composed of fragments of a porous "Alundum" carrier, 4 to 8 mesh in size and containing about 80 per cent. of fused alumina and about 20 per cent. of aluminum silicate, impregnated and coated with a catalytic oxide selected from the oxides of the metals of the 5th and 6th groups of the periodic system.

7. A catalyzer for the vapor phase partial oxidation of organic compounds, comprising a porous contact mass composed of a relatively inert, infusible, rigid, and porous carrier, in the form of fragments 2 to 20 mesh in size, impregnated and coated with catalytic vanadium oxide.

8. A catalyzer for the vapor phase partial oxidation of organic compounds, comprising a porous contact mass composed of a carrier which is rigid and highly porous, and contains fused aluminum oxide, in the form of fragments 2 to 20 mesh in size, impregnated and coated with catalytic vanadium oxide.

9. A catalyzer for the vapor phase partial oxidation of organic compounds, comprising a porous contact mass composed of a highly porous "Alundum" carrier, in the form of fragments 4 to 8 mesh in size, impregnated and coated with catalytic vanadium oxide.

10. A catalyzer for the vapor phase partial oxidation of organic compounds, comprising a porous contact mass composed of a relatively infusible, rigid, and porous carrier, containing fused aluminum oxide, impregnated and coated with a catalytic mixture of metal oxides selected from the oxides of the metals of the fifth and sixth groups of the periodic system.

11. A catalyzer for the vapor phase partial oxidation of organic compounds, comprising a porous contact mass composed of a porous "Alundum" carrier, impregnated and coated with a catalytic mixture of metal oxides selected from the oxides of the metals of the fifth and sixth groups of the periodic system.

12. A catalyzer for the vapor phase partial oxidation of organic compounds, comprising a porous contact mass composed of a carrier which is rigid and highly porous, and contains fused aluminum oxide, in the form of fragments 2 to 20 mesh in size, impregnated and coated with a catalytic mixture of vanadium oxide and an oxide of another metal selected from the fifth and sixth groups of the periodic system.

13. A catalyzer for the vapor phase partial oxidation of organic compounds, comprising a porous contact mass composed of a highly porous 'Alundum" carrier, in the form of fragments 2 to 20 mesh in size, impregnated and coated with a catalytic mixture of vanadium oxide and molybdenum oxide.

14. In the catalytic partial oxidation of an organic compound in the vapor phase, the improvement which comprises oxidizing the organic compound in the vapor phase in contact with a porous contact mass comprising a relatively inert, relatively infusible, rigid, porous carrier impregnated and coated with a metal oxide which is an oxidation catalyst.

15. In the catalytic partial oxidation of an organic compound in the vapor, the improvement which comprises oxidizing the organic compound in the vapor phase in contact with a porous contact mass comprising a porous carrier which is relatively infusible, is rigid, and contains fused aluminum oxide, impregnated and coated with a metal oxide which is an oxidation catalyst.

16. In the catalytic partial oxidation of an organic compound in the vapor phase, the improvement which comprises oxidizing the organic compound in the vapor phase in contact with a porous contact mass comprising a highly porous "Alundum" carrier impregnated and coated with a metal oxide which is an oxidation catalyst.

17. In the catalytic partial oxidation of an organic compound in the vapor phase, the improvement which comprises oxidizing organic compound in the vapor phase in contact with a porous contact mass comprising a relatively inert, relatively infusible, rigid, highly porous carrier impregnated and coated with catalytic vanadium oxide.

18. In the catalytic partial oxidation of an organic compound in the vapor phase by means of an oxygen-containing gas, the improvement which comprises passing the vapors of the organic compound admixed with the oxygen-containing gas in contact with a porous contact mass comprising a carrier which is relatively infusible, is rigid, is highly porous, and contains fused aluminum oxide and aluminum silicate, impregnated and coated with catalytic vanadium oxide.

19. In the catalytic partial oxidation of an organic compound in the vapor phase by means of an oxygen-containing gas, the improvement which comprises passing the vapors of the organic compound admixed with the oxygen-containing gas in contact with a porous contact mass comprising a highly porous "Alundum" carrier impregnated and coated with catalytic vanadium oxide.

20. In the catalytic partial oxidation of an organic compound in the vapor phase, the improvement which comprises oxidizing the organic compound in the vapor phase in contact with a porous contact mass comprising a porous carrier which is relatively infusible, is rigid and contains fused aluminum oxide, impregnated and coated with a catalytic mixture of metallic oxides selected from the oxides of the metals of the fifth and sixth groups of the periodic system.

21. In the catalytic partial oxidation of an organic compound in the vapor phase, the improvement which comprises oxidizing the organic compound in the vapor phase in contact with a porous contact mass comprising a porous "Alundum" carrier in the form of fragments 2 to 20 mesh in size impregnated and coated with a catalytic mixture of metal oxides selected from the oxides of the metals of the fifth and sixth groups of the periodic system.

22. In the catalytic partial oxidation of an organic compound in the vapor phase by means of an oxygen-containing gas, the improvement which comprises passing the vapors of the organic compound admixed with the oxygen-containing gas in contact with a carrier which is relatively infusible, is rigid, is highly porous, and contains fused aluminum oxide, impregnated and coated with a catalytic mixture of vanadium oxide and an oxide of another metal selected from the fifth and sixth groups of the periodic system.

23. In the catalytic partial oxidation of an organic compound in the vapor phase by means of an oxygen-containing gas, the improvement which comprises passing the vapors of the organic compound admixed with the oxygen-containing gas in contact with a porous contact mass comprising a highly porous "Alundum" carrier in the form of fragments 2 to 20 mesh in size impregnated and coated with a catalytic mixture of vanadium oxide and molybdenum oxide.

24. In the production of phthalic anhydride by the catalytic oxidation of naphthalene in the vapor phase and in the presence of a catalyst, the improvement which comprises passing a mixture of naphthalene vapor and an oxygen-containing gas in contact with a porous contact mass comprising a carrier which is relatively inert, relatively infusible, porous, and contains fused aluminum oxide, impregnated and coated with catalytic vanadium oxide.

25. In the production of phthalic anhydride by the catalytic oxidation of naphthalene in the vapor phase and in the presence of a catalyst, the improvement which comprises passing a mixture of naphthalene vapor and a gas containing free oxygen in contact with a porous contact mass comprising fragments of a highly porous "Alundum" carrier, 2 to 20 mesh in size impregnated and coated with vanadium oxide.

26. In the production of phthalic anhydride by the catalytic oxidation of naphthalene in the vapor phase and in the presence of a catalyst, the improvement which comprises passing a mixture of naphthalene vapor and a gas containing free oxygen in contact with a porous contact mass comprising fragments of a porous "Alundum" carrier, 4 to 8 mesh in size, and containing about 80 per cent of alumina and about 20 per cent of aluminum silicate, impregnated and coated with catalytic vanadium oxide.

27. In the production of phthalic anhydride by the catalytic oxidation of naphthalene in the vapor phase and in the presence of a catalyst, the improvement which comprises passing a mixture containing 1 part by weight of naphthalene vapor and about 10 to 50 parts by weight of air in contact with a porous contact mass comprising fragments of a porous "Alundum" carrier, 4 to 8 mesh in size, and containing about 80 per cent of fused alumina and about 20 per cent of aluminum silicate impregnated and coated with about 0.1 to 0.2 of its weight of catalytic vanadium oxide, and maintaining a temperature of about 420° to 530° C., the time of contact between the gas mixture and catalyst being about 0.05 to 0.5 seconds.

28. In the production of phthalic anhydride by the catalytic oxidation of naphthalene in the vapor phase and in the presence of a catalyst, the improvement which comprises passing a mixture containing 1 part by weight of naphthalene vapor and about 22 to 32 parts by weight of air in contact with a porous contact mass comprising fragments of a highly porous "Alundum", 2 to 20 mesh in size, and containing about 80 per cent of alumina and about 20 per cent aluminum silicate, impregnated and coated with catalytic vanadium oxide, and maintaining a temperature of about 470° to 530° C., and a superatmospheric pressure in excess of 2 pounds per square inch, the time of contact between the gas mixture and catalyst being about 0.2 to 0.25 seconds.

29. In the production of phthalic anhydride by the catalytic oxidation of naphthalene in the vapor phase and in the presence of a catalyst, the improvement which comprises passing a mixture containing 1 part by weight of naphthalene vapor and about 22 to 32 parts by weight of air in contact with a porous contact mass comprising fragments of a porous "Alundum", 4 to 8 mesh in size, and containing about 80 per cent of alumina and about 20 per cent of aluminum silicate, impregnated and coated with catalytic vanadium oxide, and maintaining a temperature of about 470° to 530° C., and a superatmospheric pressure of about 2 to 30 pounds per square inch.

30. In the production of phthalic anhydride by the catalytic oxidation of naphthalene in the vapor phase and in the presence of a catalyst, the improvement which comprises passing a mixture of naphthalene vapor and an oxygen-containing gas in contact with a vanadium oxide catalyst containing a small amount of an activator comprising aluminum.

31. In the production of phthalic anhydride by the catalytic oxidation of naphthalene in the vapor phase and in the presence of a catalyst, the improvement which comprises passing a mixture of naphthalene vapor and an oxygen-containing gas in contact with a vanadium oxide catalyst containing about 1 to 5 per cent of its weight of an activator comprising aluminum.

32. In the production of phthalic anhydride by the catalytic oxidation of naphthalene in the vapor phase and in the presence of a catalyst, the improvement which comprises passing a mixture of naphthalene vapor and an oxygen-containing gas in contact with a porous contact mass comprising a carrier which is relatively inert, relatively infusible, porous, and contains fused aluminum oxide, impregnated and coated with a mixture consisting of catalytic vanadium oxide and a relatively small amount of finely divided aluminum.

33. In the production of phthalic anhydride by the catalytic oxidation of naphthalene in the vapor phase and in the presence of a catalyst, the improvement which comprises passing a mixture containing one part by weight of naphthalene vapor and about 22 to 32 parts by weight of air in contact with a porous contact mass comprising fragments of a porous "Alundum" carrier, 4 to 8 mesh in size and containing about 80 per cent of fused alumina and about 20 per cent of aluminum silicate, impregnated and coated with about 0.1 to 0.2 of its weight of a mixture consisting of catalytic vanadium oxide and about 1 to 5 per cent of its weight of finely divided aluminum, while maintaining a temperature of about 470° to 530° C. and a superatmospheric pressure in excess of 2 pounds per square inch, the time of contact between the gas mixture and catalyst being about 0.2 to 0.25 seconds.

34. A catalyzer for the vapor phase partial oxidation of organic compounds comprising vanadium oxide and an activator therefor carried by a relatively inert, relatively infusible, rigid, porous carrier.

35. A catalyzer for the vapor phase partial oxidation of organic compounds comprising vanadium oxide and an activator therefor carried by a porous "Alundum" carrier.

36. A catalyzer for the vapor phase partial oxidation of organic compounds comprising a relatively large proportion of a vanadium oxide catalyst and a relatively small proportion of an activator comprising aluminum, carried by a carrier which is relatively infusible, is highly porous and contains fused aluminum oxide.

37. A catalyzer for the vapor phase partial oxidation of organic compounds comprising a relatively large proportion of a vanadium oxide catalyst and a relatively small proportion of an activator comprising aluminum, carried by porous "Alundum" carrier which contains fused aluminum oxide and aluminum silicate in its composition.

38. A catalyzer for the vapor phase partial oxidation of organic compounds comprising a relatively large proportion of a mixture of metal oxides selected from the oxides of the metals of the fifth and sixth groups of the periodic system, and a relatively small proportion of an activator therefor, carried by a relatively inert, relatively infusible, rigid, porous carrier.

39. A catalyzer for the vapor phase partial oxidation of organic compounds comprising a relatively large proportion of a mixture of metal oxides selected from the oxides of the metals of the fifth and sixth groups of the periodic system, and a relatively small proportion of an activator comprising aluminum, carried by a carrier which is relatively infusible, is rigid, is highly porous and contains fused aluminum oxide.

40. A catalyzer for the vapor phase partial oxidation of organic compounds comprising a relatively large proportion of a mixture of vanadium oxide and molybdenum oxide, and a relatively small proportion of an activator comprising aluminum, carried by a porous "Alundum" carrier which contains fused aluminum oxide and aluminum silicate in its composition.

41. A catalyst comprising an intimate mixture of a metallic oxide which is an oxidation catalyst and aluminum powder.

42. A catalyst comprising an intimate mixture of an oxide of a metal selected from the fifth and sixth groups of the periodic system and aluminum powder.

43. A catalyst comprising an intimate mixture of vanadium oxide and aluminum powder.

44. In the process of producing a catalyst, the improvement which comprises incorporating aluminum powder with a compound which is adapted to form a metallic oxide which is an oxidation catalyst upon being heated in an oxidizing atmosphere, and heating the mixture in an oxidizing atmosphere.

45. In the process of preparing a catalyst by mixing with an "Alundum" carrier a compound which is adapted to form a metallic oxide which is an oxidation catalyst upon being heated in an oxidizing atmosphere, and heating in an oxidizing atmosphere, the improvement which comprises incorporating aluminum powder into said mixture prior to said heating operation.

46. In the catalytic partial oxidation of an organic compound in the vapor phase, the improvement which comprises oxidizing the organic compound in the vapor phase in contact with the catalyzer of claim 34.

47. In the catalytic partial oxidation of an organic compound in the vapor phase by means of an oxygen-containing gas, the improvement which comprises passing the vapors of the organic compound admixed with the oxygen-containing gas in contact with the catalyzer of claim 37.

48. In the catalytic partial oxidation of an organic compound in the vapor phase by means of an oxygen-containing gas, the improvement which comprises passing the vapors of the organic compound admixed with the oxygen-containing gas in contact with the catalyst of claim 41.

49. In the catalytic partial oxidation of an organic compound in the vapor phase by means of an oxygen-containing gas, the improvement which comprises passing the vapors of the organic compound admixed with air in contact with a catalyzer comprising a porous carrier in the form of fragments 2 to 20 mesh in size, impregnated and coated with a metal oxide which is an oxidation catalyst, said carrier consisting of grains of fused aluminum oxide bonded into a porous mass by a vitrified aluminum silicate, the fused aluminum oxide constituting about 80 per cent of the mass.

50. In the catalytic partial oxidation of an aromatic hydrocarbon in the vapor phase by means of an oxygen-containing gas, the improvement which comprises passing a mixture of the vapors of the aromatic hydrocarbon and air in contact with a catalyzer comprising a porous carrier in the form of fragments 2 to 20 mesh in size, impregnated and coated with catalytic vanadium oxide, said carrier consisting of grains of fused aluminum oxide bonded into a porous mass by a vitrified aluminum silicate, the fused aluminum oxide constituting about 80 per cent of the mass.

51. In the production of phthalic anhydride by the catalytic oxidation of naphthalene in the vapor phase and in the presence of a catalyst, the improvement which comprises passing naphthalene vapor admixed with an oxygen-containing gas in contact with a porous contact mass comprising a relatively inert, relatively infusible, rigid, porous carrier impregnated and coated with a metal oxide which is an oxidation catalyst.

ELTON B. PUNNETT.